(12) United States Patent
Hester

(10) Patent No.: US 7,980,367 B2
(45) Date of Patent: Jul. 19, 2011

(54) DISC BRAKE ASSEMBLY WITH TONE RING

(75) Inventor: Larry B. Hester, Dayton, OH (US)

(73) Assignee: Walther Engineering And Manufacturing Company, Inc., Franklin, OH (US)

( * ) Notice: Subject to any disclaimer, the term of this patent is extended or adjusted under 35 U.S.C. 154(b) by 711 days.

(21) Appl. No.: 12/022,698

(22) Filed: Jan. 30, 2008

(65) Prior Publication Data

US 2009/0188762 A1    Jul. 30, 2009

(51) Int. Cl.
    *F16D 65/10* (2006.01)
(52) U.S. Cl. ............. 188/218 XL; 188/18 A; 301/105.1
(58) Field of Classification Search ............. 188/218 XL, 188/18 A, 17, 1.11 R, 1.11 E; 301/105.1; 310/168; 384/448; 73/494, 493, 488; 324/173, 324/174
    See application file for complete search history.

(56) References Cited

U.S. PATENT DOCUMENTS

| | | | |
|---|---|---|---|
| 3,949,841 A * | 4/1976 | Jovick et al. ............. | 188/181 R |
| 4,862,028 A | 8/1989 | Dierker, Jr. et al. | |
| 5,053,656 A * | 10/1991 | Hodge .......................... | 324/200 |
| 5,067,597 A * | 11/1991 | Young .......................... | 188/181 R |
| 5,129,741 A | 7/1992 | Deane | |
| 5,200,697 A | 4/1993 | Adler et al. | |
| 5,263,900 A | 11/1993 | Stimson | |
| 5,760,575 A | 6/1998 | Kumamoto et al. | |
| 6,568,512 B1 | 5/2003 | Tolani | |
| 6,619,440 B2 | 9/2003 | Antony et al. | |
| 6,945,367 B1 | 9/2005 | Yuhas | |
| 7,219,778 B2 | 5/2007 | Pete et al. | |
| 7,487,862 B2 * | 2/2009 | Carlson et al. .......... | 188/218 XL |
| 7,779,969 B2 * | 8/2010 | Gonska ...................... | 188/18 A |
| 2006/0124411 A1 | 6/2006 | Redgrave | |
| 2006/0272906 A1 | 12/2006 | Gonska | |
| 2007/0051571 A1 | 3/2007 | Carlson et al. | |
| 2007/0114099 A1 | 5/2007 | Pete et al. | |
| 2008/0023277 A1* | 1/2008 | Gonska .................. | 188/218 XL |

* cited by examiner

*Primary Examiner* — Bradley T King
*Assistant Examiner* — Mariano Sy
(74) *Attorney, Agent, or Firm* — Thompson Hine LLP

(57) ABSTRACT

A disc brake assembly including a rotor defining a rotational axis and including a barrel portion and a disc portion extending generally radially outward from the barrel portion, the barrel portion defining an inner surface and the inner surface defining a groove, a biasing element received in the groove, and a tone ring having an outer surface and including a step formed on the outer surface, the tone ring being positioned in the barrel portion such that the step is aligned for engagement with the biasing element.

19 Claims, 2 Drawing Sheets

DISC BRAKE ASSEMBLY WITH TONE RING

BACKGROUND

The present application relates to disc brake assemblies having a tone ring connected thereto or otherwise associated therewith and methods for forming disc brake assemblies with tone rings.

Modern vehicles may employ an anti-lock braking system ("ABS system") to increase the traction and control of the vehicle during adverse driving conditions. ABS systems prevent the wheels from locking by rapidly releasing and reapplying brake pressure. A typical ABS system includes speed sensors for monitoring the rotational speed and/or acceleration of each wheel of the vehicle relative to the other wheels of the vehicle. The ABS system may be actuated when the rotational speed or acceleration of one or more wheels is different than the rotational speed or acceleration of the other wheels.

Speed sensors may measure the rotational speed of a wheel by monitoring the rotation of the associated brake rotor. In particular, a brake rotor may be provided with an associated tone ring having a plurality of exciter teeth thereon. A sensor may be positioned adjacent to the tone ring to detect the change in magnetic flux caused by movement of the exciter teeth relative to the sensor.

Prior art attempts to integrate tone rings with brake rotors have presented numerous problems and disadvantages. For example, brake rotors with cast-in exciter teeth have presented integrity issues due to the difficulty of obtaining tight tolerances using a foundry casting process, as well as corrosion breakdown of the exciter teeth. Furthermore, cast-in teeth require the application of an expensive rust preventative coating. Bolt-on tone rings require tapped holes in the brake rotor, fastening ears on the tone ring and fasteners for securing the tone ring to the brake rotor, thereby increasing costs and presenting reliability issues. Finally, press-fit tone rings are subject to failure due to the use of different materials for the tone ring and the brake rotor, wherein the different materials may expand differently under thermal conditions, thereby causing detachment of the tone ring from the brake rotor.

Accordingly, there is a need for a new and improved disc brake assembly having a tone ring connected thereto.

SUMMARY

In one aspect, the disclosed disc brake assembly may include a rotor defining a rotational axis and including a barrel portion and a disc portion extending generally radially outward from the barrel portion, wherein the barrel portion defines an inner surface and the inner surface defines a groove, a biasing element received in the groove, and a tone ring having an outer surface and including a step formed on the outer surface, the tone ring being positioned in the barrel portion such that the step is aligned for engagement with the biasing element.

In another aspect, the disclosed disc brake assembly may include a rotor defining a rotational axis and including a barrel portion and a disc portion, the disc portion including at least one friction surface and extending generally radially outward from the barrel portion, wherein the barrel portion defines a generally circumferential inner surface and the generally circumferential inner surface defines a groove, a split retaining ring received in the groove, and a tone ring defining a generally circumferential outer surface and including a tapered step extending generally radially outward from the generally circumferential outer surface, the tone ring being positioned in the barrel portion such that the tapered step is aligned for engagement with the retaining ring.

In another aspect, the disclosed method for forming a disc brake assembly may include the steps of providing a biasing element, a rotor and a tone ring, the rotor including a barrel portion and a disc portion extending generally radially outward from the barrel portion, the barrel portion defining an inner surface and the inner surface defining a groove, the tone ring defining an outer surface and including a step formed on the outer surface, positioning the biasing element in the groove, and positioning the tone ring into the barrel portion such that at least a portion of the outer surface of the tone ring is aligned with at least a portion of the inner surface of the barrel portion and the step is aligned for engagement with the biasing element.

Other aspects of the disclosed disc brake assembly and method for forming a disc brake assembly will become apparent from the following description, the accompanying drawings and the appended claims.

DETAILED DESCRIPTION

Figure 1:
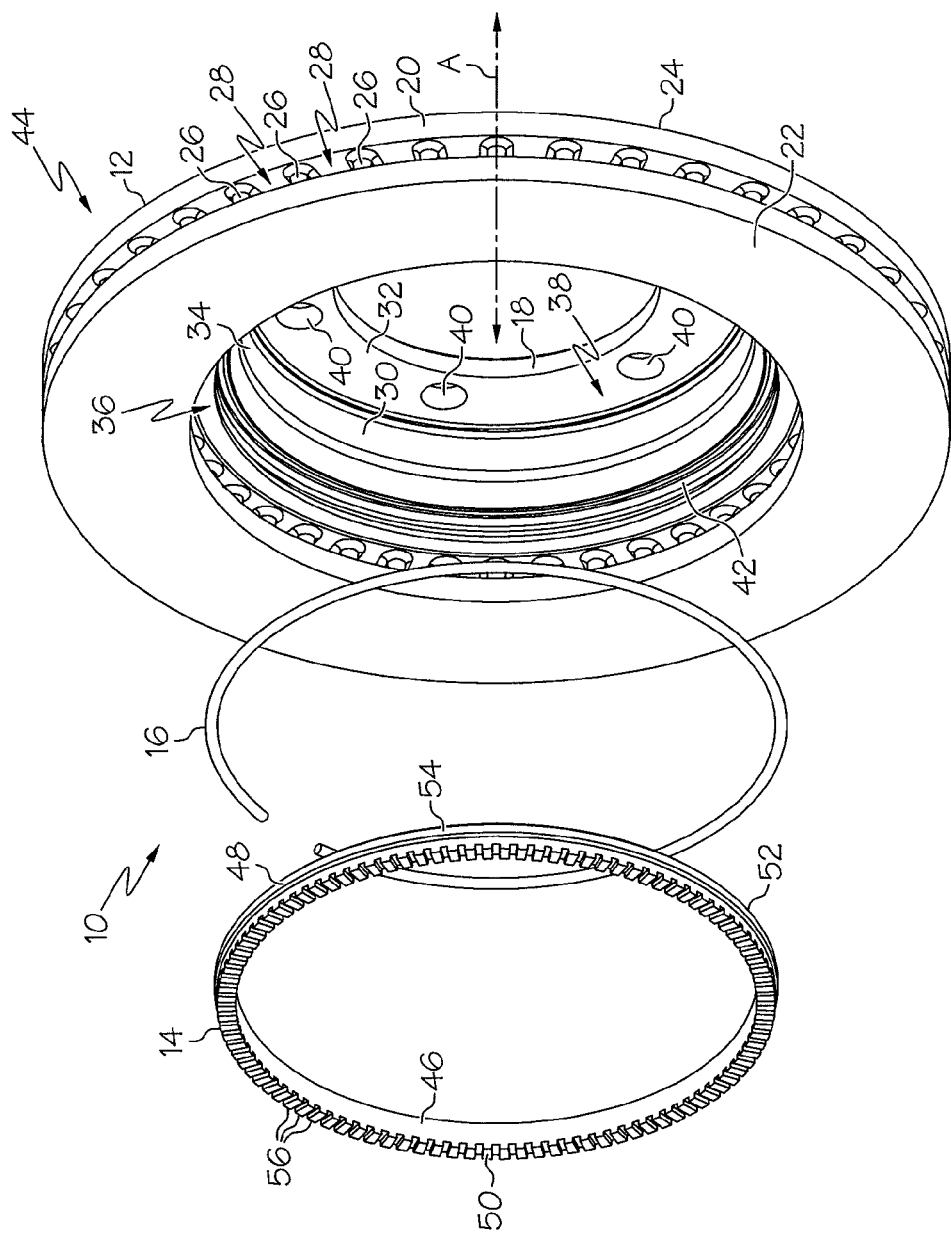
FIG. 1 is an exploded perspective view of one aspect of the disclosed disc brake assembly.
Figure 2:
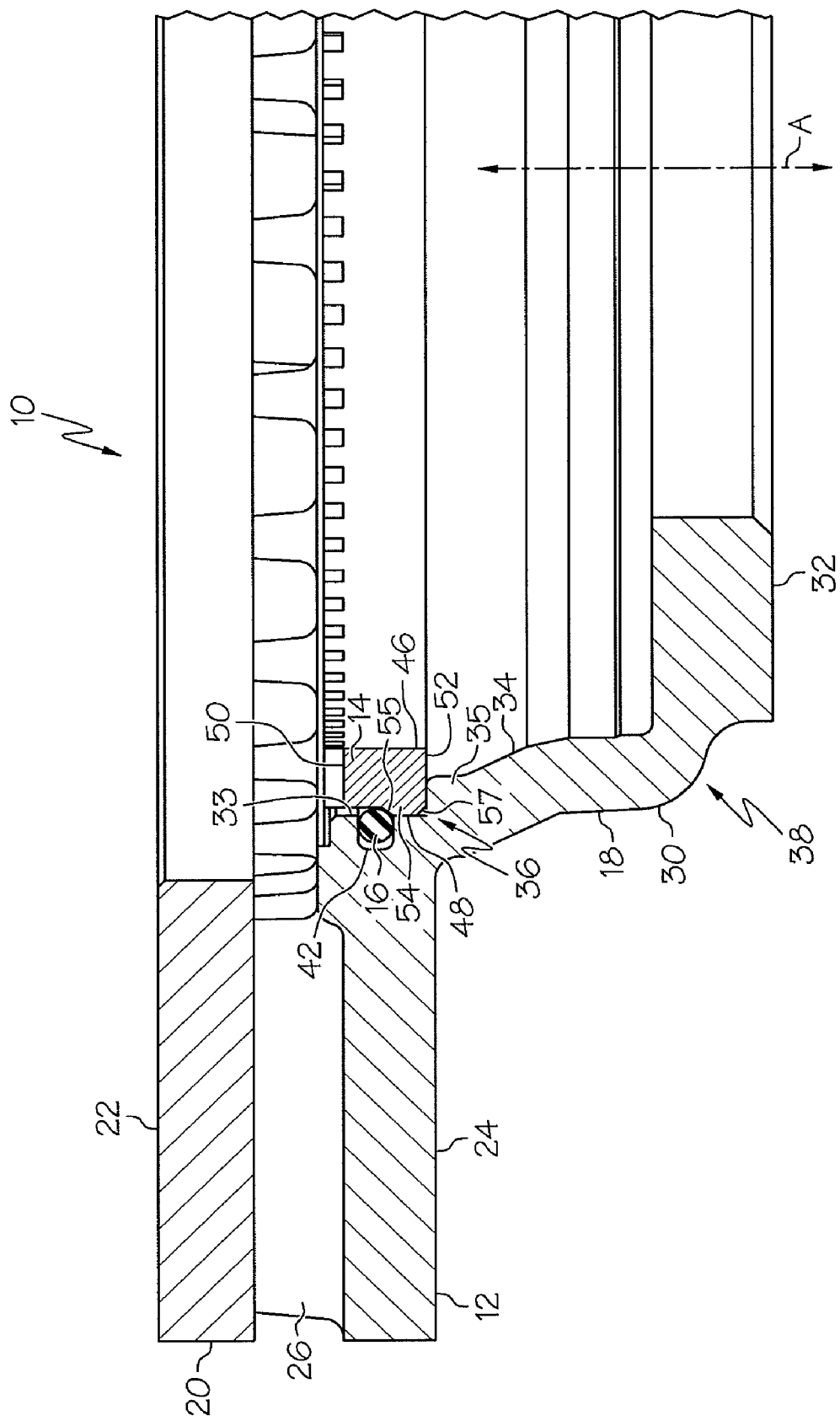
FIG. 2 is a cross-sectional view of the disc brake assembly of FIG. 1 in an assembled configuration.

Referring to FIGS. 1 and 2, one exemplary aspect of the disclosed disc brake assembly, generally designated 10, may include a brake rotor 12, a tone ring 14 and a biasing element 16. The disc brake assembly 10 may be mounted to a wheel hub (not shown) of a vehicle (not shown), such as a passenger car or a truck. One or more brake pads (not shown) or other braking mechanism may be moveable into engagement with the disc brake assembly 10 to apply a braking force thereto.

The brake rotor 12 may include a barrel portion 18 and a disc portion 20 and may define a rotational axis A. The disc portion 20 may extend generally radially from the barrel portion 18 and may include at least a first friction surface 22 and a second friction surface 24. The first and second friction surfaces 22, 24 may be separated by a plurality of spaced cooling ribs 26 that define cooling channels 28 (FIG. 1) therebetween. The cooling ribs 26 may extend generally radially outward and may facilitate airflow through the cooling channels 28 between the first and second friction surfaces 22, 24 to cool the friction surfaces during a brake apply. At this point, those skilled in the art will appreciate that multi-disc brake rotors may be used without departing from the scope of the present disclosure.

The barrel portion 18 may include a side wall 30 and a mounting surface 32. The side wall 30 may be generally aligned with the rotational axis A and may include an inner surface 34. The side wall 30 may define a tone ring receiving portion 33 and, optionally, a stop 35. The inner surface 34 of the side wall 30 at the tone ring receiving portion 33 may be machined to closely receive the tone ring 14 therein, as discussed in greater detail herein. A first end portion 36 of the side wall 30 may be connected to the disc portion 20 and a second end portion 38 of the side wall 30 may be connected to and/or may define the mounting surface 32 of the barrel portion 18. The mounting surface 32 of the barrel portion 18 may include a plurality of spaced apertures 40 sized and shaped to receive mounting bolts (not shown) therethrough such that the disc brake assembly 10 may be mounted to a wheel hub or the like.

In one aspect, the side wall 30 of the barrel portion 18 may be generally cylindrical or annular in shape such that the inner surface 34 is a generally circumferential inner surface, as shown in FIGS. 1 and 2.

A groove 42 may be formed in the inner surface 34 of the tone ring receiving portion 33 of the side wall 30 of the barrel portion 18. The groove 42 may extend generally radially outward from the inner surface 34 of the side wall 30 and may be sized and shaped to receive the biasing element 16 therein. In one exemplary and non-limiting aspect, as shown in FIG. 2, the tone ring receiving portion 33 of the side wall 30 may be formed in the first end portion 36 of the side wall 30 such that the groove 42 is generally aligned with the disc portion 20 of the brake rotor 12.

The groove 42 may extend across the entire inner surface 34 of the tone ring receiving portion 33 of the side wall 30. However, those skilled in the art will appreciate that the groove 42 may extend across only a portion of the inner surface 34 of the tone ring receiving portion 33 of the side wall 30. Furthermore, when the barrel portion 18 is generally cylindrical or annular in shape, the groove 42 may be a circumferential groove and may extend across all or a portion of the circumferential length of the circumferential inner surface 34 of the tone ring receiving portion 33 of the side wall 30. Still furthermore, those skilled in the art will appreciate that multiple grooves may be used in place of or in combination with the single groove 42 shown in FIGS. 1 and 2, thereby requiring multiple biasing elements rather than the single biasing element 16 shown in FIGS. 1 and 2.

The barrel portion 18 and the disc portion 20 of the brake rotor 12 may be formed as a single monolithic body 44 (FIG. 1) by, for example, a casting process. Alternatively, the barrel portion 18 and the disc portion 20 may be formed as separate pieces and may be connected together by, for example, a welding process, to form the brake rotor 12.

Those skilled in the art will appreciate that any brake rotor or like device defining a groove 42 in an inner surface thereof may be used without departing from the scope of the present disclosure.

The tone ring 14 may be formed as a ring or annulus and may include a radially inner surface 46, a radially outer surface 48, an axial front face 50, an axial rear face 52, a step 54 and a plurality of exciter teeth 56. The step 54 may include an axial front face 55 (i.e., the portion of the step 54 that contacts the biasing element 16 in FIG. 2), which may be tapered and, optionally, may define a chamfer 57 axially opposite of the front face 55. The step 54 may extend generally radially outward from the outer surface 48 of the tone ring 14 and may be positioned at various axial locations on the outer surface 48 of the tone ring 14. For example, as shown in FIGS. 1 and 2, the step 54 may be positioned generally adjacent to the rear face 52 of the tone ring 14 (i.e., at the axially rear portion of the tone ring 14). The exciter teeth 56 may be disposed on the front face 50 of the tone ring 14. The exciter teeth 56 may be generally equally spaced about the front face 50 of the tone ring 14 and may be sized and shaped to interact with an associated speed sensor (not shown).

In one aspect, the tone ring 14 may be formed from a material that is different than the material from which the brake rotor 12 is formed. For example, the tone ring 14 may be formed from steel or any appropriate ferro-magnetic material, while the brake rotor 12 may be formed from various materials, such as aluminum, iron-based materials and the like.

Those skilled in the art will appreciate that any tone ring 14 having a step 54 extending generally radially outward from the outer surface 48 of the tone ring 14 may be used without departing from the scope of the present disclosure.

The biasing element 16 may be any device that may be received in the groove 42 in the brake rotor 12 to apply a biasing force to the tone ring 14 and/or to engage the step 54 of the tone ring 14 when the tone ring 14 is positioned in the brake rotor 12. In one aspect, the biasing element 16 may be a split retaining ring. In one example, as shown in FIG. 2, the biasing element 16 may be a split retaining ring having a generally round or circular cross-section. In another example, the biasing element 16 may be a generally flat split retaining ring having curved corners at the inner diameter thereof. In another aspect, the biasing element may be a clip or a spring. Those skilled in the art will appreciate that various biasing elements 16 may be used without departing from the scope of the present disclosure.

Referring to FIG. 2, the disc brake assembly 10 may be assembled by positioning the biasing element 16 into the groove 42 and positioning the tone ring 14 into the barrel portion 18 of the brake rotor 12 such that the outer surface 48 of the tone ring 14 is aligned with the inner surface 34 of the tone ring receiving portion 33 of the barrel portion 18. Therefore, as the tone ring 14 is axially inserted into the barrel portion 18, the step 54 of the tone ring may overcome the biasing force of the biasing element 16 in response to the force being applied to the tone ring during the insertion step. For example, when the biasing element 16 is a split retaining ring, the split retaining ring may expand radially outward to receive the tone ring 14. The chamfer 57 may facilitate urging the biasing element 16 radially outward such that the step 54 may be properly position, as shown in FIG. 2. Once the proper axial alignment of the tone ring 14 relative to the barrel portion 18 has been achieved, the biasing element 16 may relax, either slightly or completely, and may apply a biasing force to the tone ring 14 in the radial direction and may engage the step 54, or be positioned to engage the step 54, to resist disengagement of the tone ring 14 from the brake rotor 12. As shown in FIG. 2, the stop 35 may serve as a guide for determining the proper axial alignment of the tone ring 14 relative to the brake rotor 12.

In one aspect, the outer surface 48 of the tone ring 14 (or the step 54 that extends from the outer surface 48 of the tone ring 14) and the inner surface 34 of the tone ring receiving portion 33 of the barrel portion 18 may be sized to create an interference fit or a tight slip fit therebetween when the disc brake assembly 10 is in the assembled configuration. For example, the outer diameter of the tone ring 14 may be slightly larger than the inner diameter of the tone ring receiving portion 33 of the barrel portion 18, thereby facilitating an interference fit (or a tight slip fit) therebetween. The interference fit or the tight slip fit may provide an additional means for resisting disengagement of the tone ring 14 from the brake rotor 12.

At this point, those skilled in the art will appreciate that the tone ring 14 may be axially aligned relative to the brake rotor 12 such that the groove 42 in the tone ring receiving portion 33 is positioned between the step 54 and the front face 50 of the tone ring 14, thereby allowing the biasing element 16 to engage the step 54 and resist disengagement of the tone ring 14 from the brake rotor 12. Therefore, if there is a loss of the interference fit (or the tight slip fit) discussed above, the biasing force of the biasing element 16 engaging the step 54 of the tone ring 14 will retain the tone ring 14 within the barrel portion 18 of the brake rotor 12.

Accordingly, the disclosed disc brake assembly 10 may provide a redundant and relatively low cost means for securing a tone ring 14 to a brake rotor 12.

Although various aspects of the disclosed disc brake assembly and method for forming a disc brake assembly have been shown and described, modifications may occur to those skilled in the art upon reading the specification. The present application includes such modifications and is limited only by the scope of the claims.

What is claimed is:

1. A disc brake assembly comprising:
   a rotor defining a rotational axis and including a barrel portion and a disc portion extending generally radially outward from said barrel portion, said barrel portion defining an inner surface and said inner surface defining a groove and a tone ring receiving portion;
   a biasing element received in said groove; and
   a tone ring having a generally radially facing outer surface and including a step formed on said outer surface, said step including a front face inclined relative to said rotational axis, said tone ring being positioned in said barrel portion such that said biasing element contacts said inclined front face and thereby applies a biasing force against said inclined front face to urge said tone ring against said tone ring receiving portion and thereby capture said tone ring within said barrel portion.

2. The assembly of claim 1 wherein said tone ring receiving portion includes a stop; and said biasing element is biased into engagement with said inclined front face of said outer surface of said tone ring to force said tone ring against said stop.

3. The assembly of claim 1 wherein said biasing element is a split retaining ring.

4. The assembly of claim 3 wherein said split retaining ring has a generally round cross-sectional area.

5. The assembly of claim 3 wherein said split retaining ring has a first circumferential length and said groove has a second circumferential length, wherein said first circumferential length is at least 80 percent of said second circumferential length.

6. The assembly of claim 3 wherein said split retaining ring applies a spring force to said inclined front face of said tone ring in a radially outward direction.

7. The assembly of claim 1 wherein a portion of said outer surface and a portion of said inner surface define an interference fit therebetween.

8. The assembly of claim 1 wherein a portion of said outer surface and a portion of said inner surface define a tight slip fit therebetween.

9. The assembly of claim 1 wherein said rotor is formed from a first material and said tone ring is formed from a second material, said second material being different from said first material.

10. The assembly of claim 1 wherein said step is a tapered step and extends radially outward from said outer surface.

11. The assembly of claim 1 wherein said tone ring is generally ring-shaped.

12. The assembly of claim 1 wherein said disc portion includes at least one friction surface.

13. A disc brake assembly comprising:
    a rotor defining a rotational axis and including a barrel portion and a disc portion, said disc portion including at least one friction surface and extending generally radially outward from said barrel portion, wherein said barrel portion defines a generally circumferential inner surface and said generally circumferential inner surface defines a groove and a tone ring receiving portion;
    a split retaining ring received in said groove; and
    a tone ring defining a generally circumferential outer surface and including a tapered step extending generally radially outward from said generally circumferential outer surface and having a front face inclined relative to said rotational axis, said tone ring being positioned in said barrel portion such that said split retaining ring bears against said inclined front face and urges said tone ring against said tone ring receiving portion.

14. The disc brake assembly of claim 13 wherein at least a portion of said generally circumferential outer surface of said tone ring is in close engagement with at least a portion of said generally circumferential inner surface of said barrel portion.

15. A method for forming a disc brake assembly comprising the steps of:
    providing a biasing element, a rotor and a tone ring, said rotor defining a rotational axis and including a barrel portion and a disc portion extending generally radially outward from said barrel portion, said barrel portion defining an inner surface and said inner surface defining a groove and a tone ring receiving portion, said tone ring defining an outer surface and including a step formed on said outer surface and a front face inclined relative to said rotational axis;
    positioning said biasing element in said groove; and
    positioning said tone ring into said barrel portion such that at least a portion of said outer surface of said tone ring is aligned with at least a portion of said inner surface of said barrel portion and said inclined front face of said step is engaged with said biasing element and is urged thereby into engagement with said tone ring receiving portion.

16. The method of claim 15 wherein said step of positioning said tone ring is performed after said step of positioning said biasing element.

17. The method of claim 15 wherein said step of positioning said tone ring includes a step of press fitting said tone ring within said barrel portion.

18. The method of claim 15 wherein said biasing element is a split retaining ring.

19. The method of claim 15 wherein said rotor is formed from a first material and said tone ring is formed from a second material, said second material being different from said first material.

* * * * *